HAND STEAMER WITH IRONING SOLE
Original Filed July 14, 1971
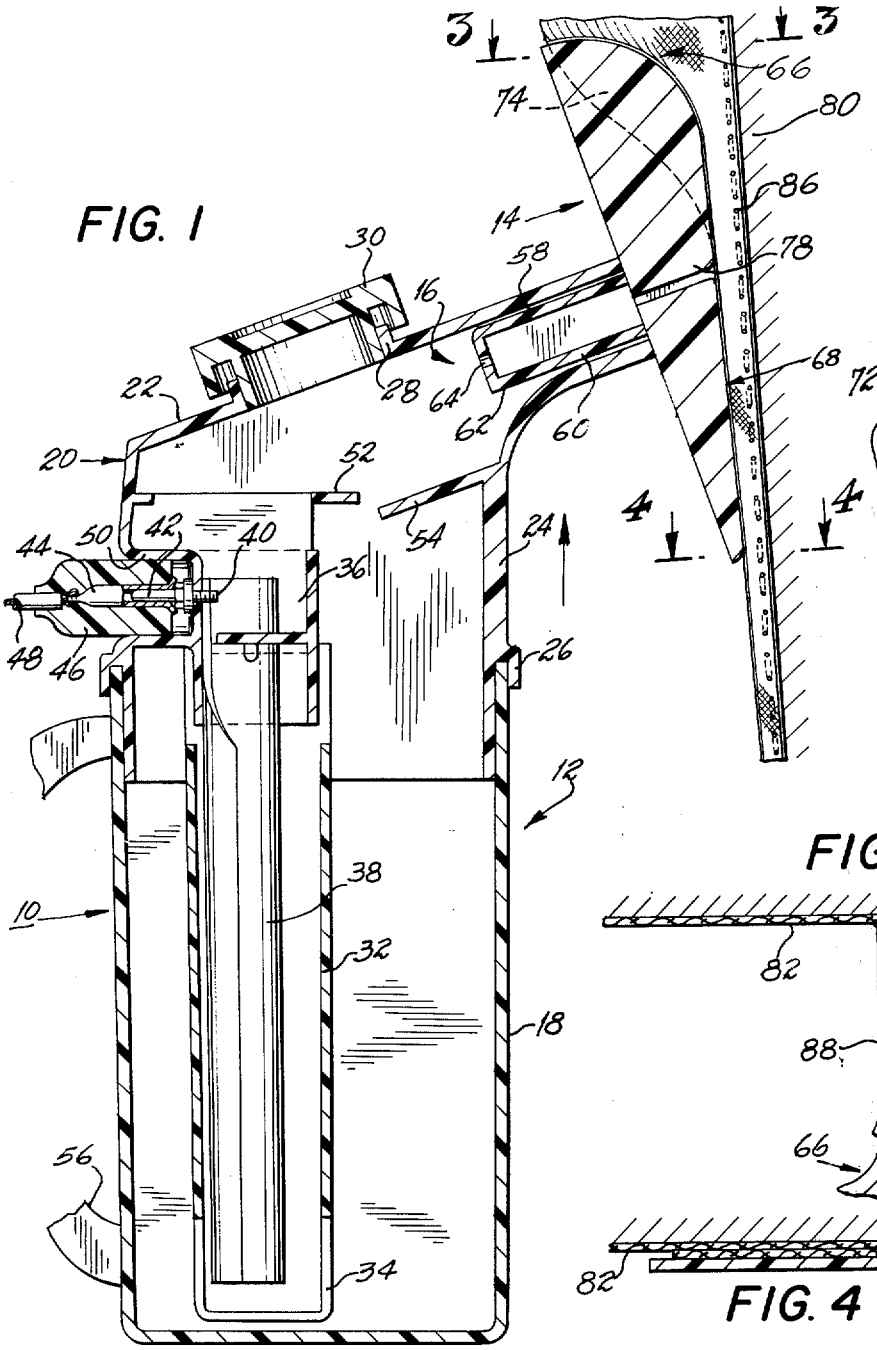
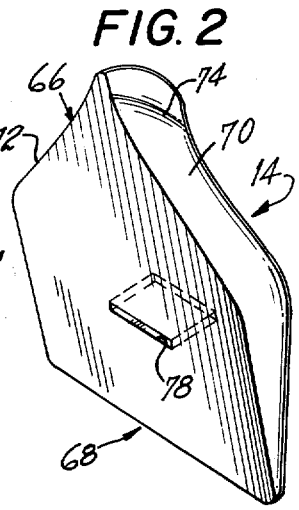
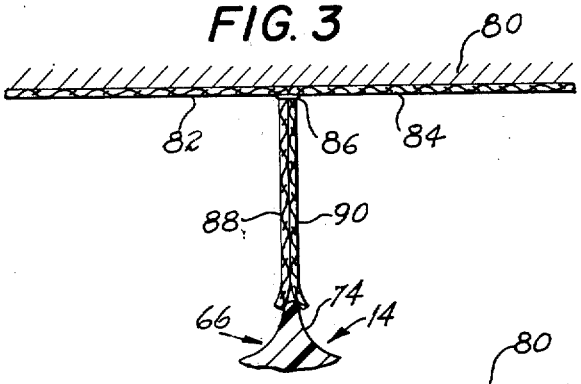
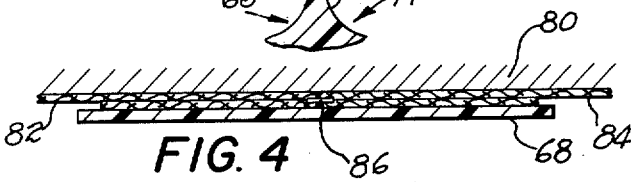
FIG. 4
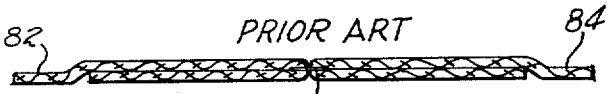
FIG. 5
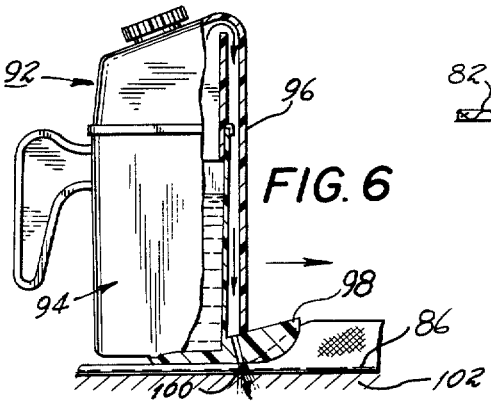
FIG. 6
INVENTOR
LEONARD OSROW
BY
ATTORNEY

United States Patent

Re. 28,418

Reissued May 13, 1975

28,418

HAND STEAMER WITH IRONING SOLE

Leonard Osrow, Great Neck, N.Y., assignor to Osrow Products Co., Inc., Glen Cove, N.Y.

Original No. 3,690,024, dated Sept. 12, 1972, Ser. No. 162,404, July 14, 1971. Application for reissue Jan. 17, 1973, Ser. No. 324,533

Int. Cl. A47j *51/00*

U.S. Cl. 38—69 11 Claims

Matter enclosed in heavy brackets [ ] appears in the original patent but forms no part of this reissue specification; matter printed in italics indicates the additions made by reissue.

ABSTRACT OF THE DISCLOSURE

A lightweight portable electric hand steamer with a special sole plate having a prow that is uniquely shaped to spread the concealed short edges at the rear of a seam joining two plies of fabric which are to be pressed into planarity. The prow includes a leading beak for initiating separation of the short rear edges. Behind the prow the sole plate is provided with a flat pressing surface. Steam issues through the pressing surface to impinge upon the fabric plies being pressed as well as upon the short rear edges so as to render them pliant for pressing. The entire sole plate, but particularly the flat pressing surface, is formed of a synthetic plastic whereby the pressing surface has a low specific heat and a low coefficient of heat conductivity so that the pressing surface is relatively cool in comparison with a conventional metal pressing surface. This has the unusual effect of preventing the outline of the steamed-flat short rear edges from showing through the planar portions of the plies after the pressing/steaming operation has been completed.

BACKGROUND OF THE INVENTION

1. Field of the Invention

Hand Steamers.

2. Description of the Prior Art

Broadly speaking, there are three categories of pressing/steaming devices. The first of these is the type of pressing/steaming device used commercially, such as a mangle with a steaming roll, or a pressing buck with a steaming head. The second is the type of pressing/steaming device which is used in the home principally for ironing and which also has a steaming adjunct. This essentially is a sadiron with a steel or plated-iron sole plate which is completely flat and is heated by an electric resistance element located directly above and in good heat relationship to the sole plate. The sole plate is formed with steam-emitting openings and a steam reservoir is located above the sole plate, being heated by the same electric heating resistance means as that employed for heating the sole plate or by a separate heating means. This type of steaming flat iron either has a water-and-steam reservoir or employs a flash steam generator. In either event, the steaming is ancillary to the principal function of the iron, which is pressing. The third type of pressing/steaming device is a lightweight portable device which only has had widespread commercial acceptance in recent years, although the same has been proposed for decades. These devices principally are steaming devices. The pressing function is essentially ancillary. Such devices are shown, for example, in Gilbert U.S. Pat. Nos. 3,372,499; 3,395,469 and 3,436,851. Such devices are characterized by a lightweight water reservoir including a heating means. The reservoir is usually vertically elongated and at its upper end has an upwardly slanting head tipped by a steam-issuing nozzle. A metal ironing plate surrounds the nozzle. The device is intended to direct steam at a hanging fabric article which may be wrinkled so that thereafter the wrinkles will hang out. For example, it is thus used in connection with hung drapes or hung garments. The metal pressing plate is almost present as an afterthought. It is not a true pressing plate in the sense that devices of this character are not designed to have such plate pressed against one surface of a fabric while the other surface rests upon a flat supporting surface such as an ironing board, this being in contrast to the second type of device described above, the steaming flat iron, which is intended to be used with the pressing surface horizontal and to be slid over a fabric resting on a horizontal ironing board surface.

A commercial pressing/steaming device is too large and bulky to be used around the home. A steaming flat iron creates a certain difficulty in pressing/steaming which is most noticeable when the fabric being pressed is composed of more than one superimposed ply and in which at least one of the underlying plies is not coextensive with the top ply, that is to say, has an edge which terminates somewhere beneath the surface of the top ply. The difficulty with this is that, principally, because the steaming flat iron presents a pressing surface which, because it is metal, has a high coefficient of heat conductivity and a high specific heat, it so greatly heats the plies being pressed/steamed that the difference in heights at the edge of the underlying non-coextensive ply becomes visible through the upper ply. This gives rise to an unesthetic, undesirable and unattractive appearance. It will be seen, for instance, where a housewise irons shirts which have this type of fabric construction or irons a seam, where the short rear edges of the two plies being joined become visible through the top flat-pressed/steamed coplanar plies.

Another difficulty with a steaming flat iron is that it requires substantial dexterity on the part of a manipulator of the iron to spread the aforesaid short rear edges during the process of pressing/steaming them into juxtaposition with the pressed/steamed fabric planar plies. There is a tendency for one of the short rear edges to overlap the other such edge during the pressing/steaming operation. The nose of the steaming flat iron does not evenly spread the two short rear edges during the pressing/steaming operation and the operator must use great care to part these two edges immediately before the actual pressing/steaming operation and to keep them thus uniformly separated during the pressing/steaming operation itself. The manufacturers of steaming flat irons attempted to solve this problem by the use of a sharp, i.e., almost pointed, shape of nose for the sole plate, but this configuration has not been successful.

On the other hand, the third type of pressing/steaming devices (with the auxiliary pressing plates) are not particularly successful so far as their pressing function is concerned, a part of their difficulty arising from the multiple uneven plies as abovementioned and being due to the fabrication of the pressing plates from metal and a part of their difficulty being that the pressing plates had nothing that could be really called a nose so that they were essentially useless for steam-flattening a seam.

SUMMARY OF THE INVENTION

1. Purposes of the Invention

It is an object of this invention to provide an improved pressing/steaming device which is not subject to the foregoing drawbacks.

It is another object of this invention to provide an improved lightweight portable pressing/steaming device with which an operator very easily and quickly and with little expertise and a low level of manual dexterity can flat-press/steam a seam.

It is another object of this invention to provide an improved lightweight portable pressing/steaming device which is characterized by its ability to press/steam plural plies of non-coextensive areas, the same being due to the use of a pressing/steaming plate of non-metallic character, such as a synthetic plastic, which has a low coefficient of heat conductivity and a low specific heat.

It is another object of this invention to provide an improved lightweight portable pressing/steaming device having an unusually configured prow which simplifies the uniform parting of the rear edges of a seam preparatory to flat-pressing/steaming the same.

It is another object of this invention to provide an improved lightweight portable pressing/steaming device which is specially designed for low cost mass production.

It is another object of this invention to provide an improved lightweight portable pressing/steaming device which constitutes relatively few and simple parts and is, withal, rugged and efficient in operation.

Other objects of this invention in part will be apparent and in part will be pointed out hereinafter.

2. Brief Description of the Invention

A lightweight portable pressing/steaming device constituting a water-containing reservoir provided with heating means for generating steam from the water in the reservoir. The device includes a plastic sole plate having a flat pressing surface with at least one opening therein. A passageway is included to convey the freshly generated steam to the opening in the pressing surface. The sole plate has a prow resembling in configuration the prow of a ship, which is to say, the prow curves upwardly and forwardly from the flat pressing surface to the nose of the sole plate and at the same time curves upwardly and inwardly from both sides of an imaginary extension of the pressing surface. Phrased differently, the prow has two sides, each of which is compoundly curved, one of the curvatures being upwardly and forwardly and the other upwardy and inwardly away from the sides. Moreover, each of the sides in its inward curvature is slightly concave near the front of the prow. Because of the opposite compound curvature of the two sides of the prow, these two sides meet at the center of the prow in an upwardly curved forwardly jutting beak which is disposed along a line midway beween the sides of the sole plate and prow, the prow and beak resembling the prow of a whaling boat. This configuration is peculiarly adaptable for entering between and nicely and uniformly spreading the two short rear edges of a seam and guiding them gently into flat juxtaposition against the backs of their affiliated fabric plies which are to be pressed into planarity.

The forwardly jutting beak acts as a pilot that first enters between and separates the two plies and tends to flex them toward the sides of the prow from which they are guided down into their ultimately flat position underneath the pressing surface. The combination of this beak and prow makes it quite difficult for an operator who exercises even the slightest degree of care to incorrectly press/steam a seam.

The sole plate, and particularly the pressing surface, because it is made of plastic, has a low coefficient of heat conductivity and a low specific heat so that the surface of the uppermost flat-pressed/steamed fabric plies does not tend to show through them an impression of the flat-pressed/steamed separated rear edges, as they do when such fabrics are pressed with a steaming flat iron.

The invention accordingly consists in the features of construction, combinations of elements and arrangements of parts which will be exemplified in the devices hereinafter described and of which the scope of application will be indicated in the appended claims.

BRIEF DESCRIPTION OF THE DRAWINGS

In the accompanying drawings in which are shown various possible embodiments of the invention:

FIG. 1 is a vertical front-to-back sectional view of a lightweight portable pressing/steaming device embodying the present invention, the same being shown in the process of flat-steaming a seam which is backed up by a flat surface such as the top surface of an up-ended ironing board, the latter being indicated in a slightly inclined position in order to permit the pressing/steaming device to be shown upright;

FIG. 2 is a perspective view of the sole plate removed from the pressing/steaming device;

FIG. 3 is a transverse sectional view through a pair of stitched-together fabric plies with the main bodies of the plies flat against a supporting surface such as that of an ironing board and with the short rear edges extending perpendicularly thereto and still in contact with each other, a fragmentary and then operative part of the prow and beak being indicated in the position at which separation of these short rear edges is initiated;

FIG. 4 is a sectional view taken substantially along the line 4—4 of FIG. 1, the same being similar to FIG. 3 except that the plies and short rear edges are shown after the pressing/steaming device has flattened the short rear edges against the planar main portions of the fabric plies;

FIG. 5 is a view similar to FIG. 4 but illustrating the main fabric plies and the short rear edges as they appear after such plies and rear edges have been steam-flattened with a conventional steaming flat iron; and FIG. 6 is a side partially-broken-away side view of a pressing/steaming device embodying a modified form of the invention wherein the flat pressing surface of the sole plate, and, indeed, the entire sole plate, is arranged to be oriented in a substantially horizontal position during the pressing/steaming operation as distinguished from the substantially vertical position of the sole plate in the first illustrated form of the invention.

DESCRIPTION OF THE PREFERRED EMBODIMENTS

Referring now in detail to the drawings, and more particularly to FIGS. 1 and 2, the reference numeral 10 denotes a pressing/steaming device constructed in accordance with and embodying the instant invention. Basically, the device includes a steam generator 12, a unique sole plate 14, and a passageway means 16 that conducts steam from the generator to the sole plate and also functions to support the sole plate.

The steam generator and passageway means are entirely conventional in a steaming device and are shown and described in detail in co-pending application, Ser. No. 86,215, filed Nov. 2, 1970 and assigned to the assignee of the present application. However, the same will be briefly described herein for the purpose of completeness. It may be mentioned at this time that the specific structure of the steam generating means is not critical to proper functioning of the present invention, which is to say, the steam generating means can be of any type whatsoever. Thus, in the co-pending application above referred to and as shown herein, the heating structure of the steam generating means is of electrolytic nature, heat being created by passage of current between a pair of spaced metal electrodes partially submerged in a water solution which contains dissolved salts to improve the ionization thereof and render the same a good electrolyte.

It should be understood that the instant invention is not restricted to electrolytic heating. For example, electric resistance heating can be used such as illustrated and described in Gilbert U.S. Pat. No. 3,436,851 issued Apr. 8, 1969. Still another way of creating steam is to use a flash steam generator of the type illustrated, for example, in Gilbert U.S. Pat. Nos. 3,372,499 and 3,396,469, in which a metal plate is electrically heated as by resistance heating and water is sprayed onto the plate at a rate which will generate steam as rapidly as desired.

Specifically referring to the steam generator 12 illustrated herein, the same includes an open-topped mouth plastic vertically elongated reservoir 18 having a cover 20. The cover includes a top 22 with depending side walls 24 that are designed to telescopically engage the open top of the reservoir. The side walls include a sealing joint 26 that mates with the rim of the mouth and is preferably permanently secured thereto as with a plastic cement. The top 22 includes a water-filling opening 28 which is normally closed by a push-in friction fitted cap 30. When it is desired to introduce water into the reservoir the cap is pulled off and water is poured through the opening into the reservoir. If the water is sufficiently hard, its dissolved salt content will be enough to act as an electrolyte. If not, ordinary table salt may be added for this purpose in a manner well known to the art and quite widely used in connection with vaporizers that are electrolytically heated.

In order to concentrate the electrolyteic heating effect so as to render it unnecessary to raise all of the water in the reservoir 18 to boiling temperature, a vertically elongated plastic steaming compartment 32 is included. The steaming compartment is of much smaller transverse cross-section than the reservoir and is located within the same. The steaming compartment is vertically disposed and is connected at its upper end to the cover 20. The particular mode of connection is of no significance, one suitable arrangement being illustrated. The steaming compartment has a restricted opening at its bottom in the form of a slot 34 to permit water from the reservoir to enter the steaming compartment. Thus, the levels of the water in the compartment and reservoir will be the same when the device is not operating. The steaming compartment is twinned adjacent to its top, that is to say, is provided with a vertical separator 36 unitary with the compartment. This separator provides a pair of side-by-side head chambers adjacent the top of the steaming compartment.

A different bare metal electrode 38 is mounted in each of these head chambers in a manner such that the electrodes extend downwardly into the compartment in side-by-side, but spaced, parallel relationship, separated only by the electrolyte which is the salted water. The upper ends of the electrodes are supported against the rear wall of the steaming compartment as by electrically conductive screws 40. Said screws extend through the back wall of the steaming compartment above the level of the water in the reservoir to terminate in twin metal prongs 42 that are designed to be engaged by a pair of female contacts 44 contained in a plug 46 and adapted to be connected to a suitable source of electric energy by a conventional two-wire electric wire 48. Thus, when a conventional twin-bladed plug at one end of the wire is inserted into an electric house outlet and the plug at the other end in a socket 50 forming part of the device 10 and surrounding the prongs 42, the electrodes 38 are supplied with potential and current flows between them and through the electrolyte between the electrodes to generate heat in the localized volume of the steaming compartment in a rather short time, usually within a minute, sometimes within a few seconds, depending upon the conductivity of the electrolyte. The temperature of the water in the steaming compartment thus will be elevated to steaming temperature and steam will rise out of the open top of the steaming compartment.

It is interesting to note that, as has been pointed out in co-pending application, Ser. No. 86,215, the construction of the steaming compartment is such that egress of the steam from the compartment is somewhat constrained. Also flow of steam from the compartment into and through the passageway means 16 hereinafter to be described in detail, likewise is constrained so that if steam is generated at too rapid a rate, a mild steam pressure is created within the steaming compartment above the level of the electrolyte therein. This will depress the level of the electrolyte in the steaming compartment, whereupon some of the electrolyte will flow out of said steaming compartment through the slot 34 into the main body of the electrolyte in the reservoir 18. Thus, the effective area of the electrodes submerged in the electrolyte in the steaming compartment is reduced, and with such reduction, the current flow is lessened, so that the rate of steaming is lowered until equilibrium is reached. Thereby the construction described, in effect, is semi-self-regulatory so that if there should happen to be too much salt in the electrolyte the steaming rate nevertheless will not proceed at too rapid a pace.

The separator 36 has a forwardly extending flange 52 at its top which functions as a baffle. The baffle serves two purposes; one is to inhibit the upward flow of steam into the passageway means 16 and the other is to inhibit the flow of water from the reservoir to the passageway means if the device should be inclined rearwardly or sidewardly quite far out of its vertical position illustrated in FIG. 1. A second flange 54 extends downwardly and rearwardly from the front side wall 24 of the cover 20 and serves the same purpose as the flange 52. However, the flange 54 is particularly intended to prevent the flow of water from the reservoir to the passageway means when the device 10 is tilted too far forwardly, the flange 52 serving a similar functioin for sideward tilting positions of the device.

Although the device can be manipulated in the manner subsequently to be described by handling the reservoir or cover directly, it is preferable to include a gripping means such as a handle 56 attached to the reservoir to facilitate such handling.

The passageway means 16 is in the form of an upwardly and forwardly inclined throat communicating with the reservoir and constituting a top wall 58, a bottom wall 60 parallel thereto and side walls that conjointly define a horizontal laterally elongated cross-section through which steam issuing from the steaming compartment 32 and gaining admittance to the passageway means in large part between the flanges 52, 54, passes forwardly and out of the device at the front of the passageway means. A water particle trap 62 may be included in the form of a cup which fits into the passageway means and is closed except at its front and except for perforations 64 in its back wall. The provision of this trap also tends to prevent steam from condensing on the internal walls of the passageway means. In effect, therefore the trap constitutes the emission end of the passageway means and is insulated from the ambient atmosphere by the space between the trap and the walls of the passageway means.

As previously mentioned, the foregoing description of a specific steam generator and passageway means has been set forth solely by way of example and is not to be construed as a limitation upon the invention.

The sole plate 14 is the novel and new element of the present invention. Heretofore, a steaming device constituting the generator and passageway means has been provided as illustrated, described and claimed in copending application, Ser. No. 86,215. However, in the device of that application the passageway means, inclusive of the trap, terminated in an externally concave slotted discharge plate, the slot extending from side to side of the passageway means so that steam simply issued therefrom and was directed by a user to a hanging fabric such as a drape or garment, suspended, for example, from a traverse rod or garment hanger.

The device of the present invention differs from the device shown in said co-pending application by the provision of the unique sole plate 14 which functions, as has been mentioned before, both as a pressing device and as a guide to flatten out, prior to pressing, the short rear edges of a seam joining a pair of fabric plies.

The configuration of the sole plate 14 is best seen in FIG. 2, although FIGS. 1 and 3 also assist in understanding the shape thereof. Fundamentally, the sole plate constitutes two portions, although these two are of one piece and there is no delineatable line between them. The two portions are, firstly, a prow 66, and, secondly, a pressing section 68. The prow and pressing section are jointly made from a single piece of a synthetic resin whereby the sole plate, and in particular, the pressing section will have a low coefficient of heat conductivity and a low specific heat. Any synthetic plastic which will not experience thermal deformation at the temperature of steam is usable. Preferably a plastic is used which has a high resistance to heat and a high strength. It preferably also has a high dielectric coefficient and a high resistance to impact. It is also helpful for the plastic to have a high flexural modulus and a high strength. Desirably, the thermal distortion temperature should be in excess of 250° F., desirably, too, the surface of the plastic is smooth and has a low coefficient of friction. This latter parameter is not of critical significance because all smooth surfaces of synthetic plastics have a sufficiently low coefficient of friction to be usable in accordance with the present invention. Nevertheless, some plastics are more slippery than others and, therefore, have better ironing characteristics. Typical of the plastics which are usable in accordance with the present invention are polycarbonates, polyphenylene oxides, polysulfones, phenol formaldehydes, urea formaldehydes, epoxies, polytetrafluoroethylenes, polychlorotrifluoroethylenes, polyesters, silicones, alkyds, furans, diallylphthalates and caseins. The polyphenylene oxides have been found to be particularly useful in view of their low water absorption, their dimensional stability in the presence of water, high dielectric constant and their chemical inertness, although similar qualities are generally true of the other synthetic plastic mentioned.

The sole plate can be made by casting, i.e. molding, or, if the synthetic resin used is a thermoplastic, by forming from sheets with the assistance of heat and pressure.

The configuration of the prow 66 resembles that of the prow of a boat. This configuration constitutes two sides 70, 72 that are mirror images of each other, that is to say, there is a right side 70 and a left side 72. Each side curves upwardly as viewed from the side of the prow (see, for example, FIG. 1), the curvature being gradual as at the portion of the side adjacent the pressing section 68 and gradually being of shorter radius of curvature until, by the time the curvature, as viewed from the side, reaches the tip or nose of the prow, the side is almost perpendicular to a plane parallel to the pressing section.

In addition to this forward and upward curvature as viewed from the side, each side of the prow curves upwardly and inwardly as best can be seen in FIG. 2. Moreover, each of the sides, in its inward curvature, is slightly concave near the front of the prow.

Thus, there is a compound curvature, one curvature being upwardly and forwardly and the other being upwardly and inwardly. This makes the prow V-shaped as viewed from the top, with a slight concavity at each side near the tip, and simply downwardly concave as viewed from the side. The inward curvature of the right and left sides is opposite, this being the reason that the right and left sides are mirror images of each other. Moreover, because the inward curvatures of the two sides are opposite, the two sides meet at the center of the prow in an upwardly curved forwardly jutting peak 74 which runs along a longitudinal center line from the tip of the prow rearwardly. Obviously, the directions of inclinations of the sides of the prow from this beak sideways are opposite and in both directions, in addition to being inclined sideways, being inclined rearwardly. The beak is in a plane perpendicular to the pressing section and lies on the center longitudinal plane of symmetry of the sole plate. The sides 70, 72 of the prow terminate rearwardly approximately half the length of the prow in back of the tip of the prow, the rear edges of these sides at the termination being forwardly inclined about 30° away from a normal of the plane to the pressing section (see FIG. 1), although this particular degree of inclination is of no significance.

The pressing section 68 is flat. As mentioned previously, the rear of the prow is an unbroken, i.e. smooth, con- At approximately the line of demarcation between the pressing section and the prow, the sole plate is provided with an opening 78 of which there may be one or several, only one being illustrated, for the passage of steam generated in the steaming reservoir and conducted up to the opening by the passageway means 16.

The prow is secured in any suitable manner to the front of the passageway means (including the trap 62). For example, the prow may be held to these elements by adhesive or by autogenous welding, e.g. by the use of heat and pressure or high frequency dielectric heating. The prow is positioned on the passageway means so that the opening 78 is aligned with the front of the open front of the steam trap 62 whereby there will be no impediment to the flow of steam from the passageway means to and through the opening or openings in the sole plate. As a matter of esthetics and ease in use, the sides of the sole plate are substantially parallel to the sides of the reservoir 18, said reservoir being of rectangular transverse cross-section. Likewise the rear edge of the sole plate is substantially parallel to the front wall of the reservoir for the same reasons.

To use the pressing/steaming device 10, the steaming generator is set into operation in the manner previously indicated and the sole plate is applied to a fabric article to be pressed/steamed with the pressing section flat against the article, or slightly inclined away from it with the rear edge of the sole plate engaging the article. Desirably, however, the pressing against the fabric ply. Desirably, also, the surface of the fabric ply or plies opposite to that engaged by the sole plate is in juxtaposition with and backed up by a flat surface such as that of an ironing board or wall, so that the fabric ply or plies may be sandwiched and squeezed between the sole plate, and particularly the pressing section, and the supporting backup surface. Because of the particular type of generator used which requires that the same be substantially upright to prevent spillage of water from the reservoir, and because the sole plate is approximately parallel to the front wall of the generator, it is desirable with this generator and steaming device incorporating the same, for the surface which backs up the article being pressed to be substantially vertical, and it is for this reason that a wall has been mentioned. If an ironing board is used, it is desirable to up-end the same so that the ironing surface of the board is substantially vertical. This surface has been indicated by the reference numeral 80 in the figures where it has been shown slightly out of vertical in FIG. 1 in order that the sectional view of the device 10 may be oriented in an easily understood vertical portion.

One of the unique uses of the device 10 and the use to which it is peculiarly adapted by virtue of the special configuration of the prow 66 is for opening and flat-pressing/steaming seams. In FIG. 3 a typical seam is illustrated prior to pressing/steaming. This seam constitutes two plies 82, 84 of fabric which are joined by a line of stitching 86. Actually, the line of stitching is usually referred to as the "seam," although in the present description such line as well as the thus formed fabric piles have been referred to embracively as a "seam." In the making of this seam, one ply of fabric is laid flatly on the other flat ply and the same are run through a sewing machine to form a line of stitching. The line of stitching conventionally is located near one matching set of edges of the fabric plies, and the portions of the fabric plies between the line of stitching and the aforesaide edges is referred to herein as the "short rear edges" of the seam.

After this stitching and for the purposes of pressing/steaming, the two main bodies of the fabric plies 82, 84 are opened up (oppositely directed) by hand and laid flat on a surface such as the pressing surface of an ironing board or wall 80 as illustrated in FIG. 3. At this time the two main bodies of the fabric plies are coplanar and the short rear edges 88, 90 extend substantially perpendicularly away therefrom. The angle of extensions is of are limp, the perpendicular erect position thereof as shown is somewhat idealistic. However, the short rear edges do extend away from the main bodies of the fabric plies 82, 84.

It is essential for the preparation of a finished garment that these short rear edges lie flat against the back faces of the main bodies of the fabric plies 82, 84 and preferably not to have the two short rear edges overlying each other in whole or in part, that is to say, each short rear edge should overlie only the main body of the fabric of which it is a part. Phrased still differently, the two short rear edges should be spread apart and then pressed/steamed to lie in the desired final position.

Heretofore, the way this has been accomplished was for an operator, after the plies 82, 84 have been opened up and laid flat against a surface 80, to separate the short rear edges 88, 90 and place them in the desired position, after which a pressing surface was brought against them. The pressing surface might be that of a mangle or buck if the pressing operation was done professionally. If the pressing operation was done domestically, it has been conventional heretofore to separate the two short rear edges 88, 90 by hand and to do so immediately in front of the tip of a conventional steaming flat iron as the iron progressed along the line of stitching. However, the sharp nose of a conventional steaming flat iron tended to wander away from the line of stitching deviating either to the right or to the left, and the short rear edges also tended to deflect so that portions thereof folded over the line of stitching and the finished pressed/steamed seam was not uniform.

Moreover, in the prior art, because the sole of the steaming flat iron was made of metal and was quite warm and had a high coefficient of heat conductivity and a high specific heat, and because usually the pressing was done on a flat soft surface, there was a marked tendency for the shape of the short rear edges to show through the opposite front face of the plies as illustrated in FIG. 5. In other words, the iron tended to bring into one plane the now-rear surfaces of the short rear edges and the back surfaces of the plies not coextensive with the flattened short rear edges. As will be seen in this figure, the front faces of the main bodies of the plies forward of the short rear edges tended to protrude slightly from the balance of the plies, thus creating a noticeable unevenness. Phrased differently, the short rear edges "showed through" the fronts of the bodies of the fabric plies.

Both of these aforesaid difficulties have been avoided by the use of the pressing/steaming device of the present invention. The first drawback was the irregularity of the short rear edges after they had been pressed/steamed because an operator required very considerable dexterity to ensure that the two rear edges were uniformly folded away from the line of stitching. With the pressing device 10, however, this degree of dexterity no longer is required. Now all the user has to do is to guide the beak between the short rear edges as illustrated, for instances, in FIG. 3, while moving the device 10 along the seam. The upwardly and rearwardly curved sides 70, 72 of the prow will cause the short rear edges to flow (flex) smoothly to opposite sides and then to flow (flex) smoothly into a flat state lying against the backs of the main bodies of the fabric plies and, as they do so, to be steamed by steam issuing through the opening 78. Thereafter, the short rear edges are engaged by the pressing section 68 and forced thereby against an ironing surface 80.

The low coefficient of heat conductivity and low specific heat of the sole plate and the pressing section 68 do not create the condition shown in FIG. 5, but rather the condition shown in FIG. 4. In other words, the previous tendency to force the short rear edges into the plane of the back surfaces of the main bodies of the fabric plies, as when a steaming flat iron was used, no longer exists and, instead, the short rear edges now tend to remain in their own planes in back of the common plane of the entire main bodies of the fabric plies so that these short rear edges no longer "show through" on the front faces of the fabric plies.

It also will be observed that the construction of the device 10 constructed in the manner illustrated and described with reference to FIG. 1 cannot be used effectively to press/steam a fabric article when the sole plate 14 is in substantially horizontal position because of the inability to retain water in the reservoir. If it is desired to use the pressing/steaming device with a generally horizontal sole plate, an orientation which is conventional for the ubiquitous steaming flat iron, a construction such as shown in FIG. 6 may be employed. FIG. 6 delineates a pressing/steaming device 92 embodying the present invention and having a generator 12 described in detail and which will, hence, not be redescribed nor specifically illustrated. The device 92, instead of having an upwardly and forwardly inclined passageway means 16, has a passageway means 96 the entry to which is at the top of the steam generator and the exit from which is adjacent the bottom of the steam generator, said passageway means extending vertically down the front of the steam generator.

At the bottom of the passageway means a sole plate 98 is secured. Said sole plate is identical to the sole plate 14 previously discussed in substantial detail and which, therefore, will not now be redescribed. Suffice it to say that in the device 92 the sole plate is substantially horizontal, the prow lifting upwardly and curing forwardly and to both sides in the same manner as described with respect to the prow 66. Similarly, there is a steam-passing opening 100 in the sole plate 98 which is similar to the opening 78 in the sole plate 14.

It readily will be appreciated that with the foregoing arrangement the device 92 may be held in a substantially vertical position, that is to say, with the reservoir erect, while the sole plate is at the bottom of the device so that the sole plate may now be horizontally disposed in use without fear of spilling the water electrically heated within the reservoir. The operation of the device 92 is the same as that of the device 10 except for the fact that the sole plate is now horizontal and, therefore, the surface 102 against which a fabric article is to be pressed can be horizontally disposed and the device, therefore, manipulated with a somewhat higher degree of facility by a housewife.

It thus will be seen that there are provided pressing/steaming devices which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention there is claimed as new and desired to be secured by Letters Patent:

1. A light weight portable hand manipulable pressing/steaming device comprising an electrical steam generator, said electrical steam generator including means for receiving electrical energy and utilizing the same to convert water to steam, a passageway leading from the steam generator for receiving steam formed thereby, a steam discharge exit in communication with said passageway, a sole plate including a pressing section having means for pressing a fabric against a flat surface, said pressing section containing an opening therein in communication with said steam discharge exit, said sole plate made of a synthetic plastic which has a low coefficient of heat conductivity, a low specific heat, a high heat resistance, a high strength, a high dielectric coefficient, a high resistance to impact, a high flexural modulus, a heat distortion temperature in excess of 250° F. and a low rate of water absorption and the plastic being selected from the class consisting of polycarbonates, polyphenylene oxides, polysulfones, phenol formaldehydes, urea formaldehydes, epoxies, polytetrafluoroethylenes, polychlorotrifluoroethylenes, polyesters, silicones, alkyds, furans, diallylphthalates and caseins.

2. A device according to claim 1 wherein the sole plate further includes means to spread the concealed short edges at the rear of a seam joining two plies of fabric which are to be pressed into planarity.

3. A device according to claim 2 wherein said spreading means comprises a prow having opposite sides which are compoundly curved to curve upwardly in forward and inward directions, the two sides of the prow being mirror images of each other and meeting at an upwardly curved forwardly jutting beak.

4. A device according to claim 3 wherein the prow and the pressing section are in one piece.

5. A synthetic plastic one piece sole plate for use on a hand steamer having a steam opening therein for communication with the steam discharge exit of a hand steamer so that the steam created in the hand steamer will issue through the sole plate, said sole plate including means for spreading the concealed edges at the rear of a seam joining two plies of fabric which are to be pressed, said spreading means including a prow having opposite sides which are curved upwardly in forward and inward directions, the two sides of the prow meeting at an upwardly curved forwardly jutting beak, and means for pressing the plies which have been spread by the prow.

6. A sole plate according to claim 5 wherein the pressing means includes a pressing section.

7. A sole plate as set forth in claim 6 wherein the plastic of the sole plate has a low coefficient of heat conductivity and a low specific heat.

8. A sole plate as set forth in claim 7 wherein the plastic has a high heat resistance, a high strength, a high dielectric coefficient, a high resistance to impact, a high flexural modulus, a heat distortion temperature in excess of 250° F., and a lower water absorption.

9. A sole plate as set forth in claim 8 wherein the plastic is selected from the class consisting of polycarbonates, polyphenylene oxides, polysulfones, phenol formaldehydes, urea formaldehydes, epoxies, polytetrafluoroethylenes, polychlorotrifluoroethylenes, polyesters, silicones, alkyds, furans, diallylphthalates and caseins.

10. A sole plate according to claim 5 wherein the opposite sides of the prow are compoundly curved and are mirror images of each other.

*11. A hand held pressing/steaming device having a certain operative pressing position, said device comprising a casing of electrically non-conductive material with a hollow interior defining a reservoir, selectively closeable water intake means in said casing for receiving water for said reservoir, a pair of spaced apart electrodes, means securing said electrodes to said casing and for electrically isolating said electrodes from one another, a portion of each of said electrodes being located in said reservoir and normally submerged in water in said reservoir when the device is in said position so that when the electrodes are supplied with potential a current flows between them through the water to generate heat which evolves steam from water in the reservoir, a sole plate of electrically nonconductive material constituting the bottom of the reservoir and being located at the lowermost portion of said device in the certain position thereof, said sole plate having a steam-passing opening at the bottom surface thereof, passageway means communicating the upper portion of the interior of said casing with said steam-passing opening in said sole plate so that the steam evolved in the reservoir is discharged through said sole plate steam-passing opening, said sole plate being horizontal when said device is held in the certain position whereby said said device can press and steam articles supported on a horizontal surface whereby the water in the reservoir prevents the sole plate from being overheated.*

References Cited

The following references, cited by the Examiner, are of record in the patented file of this patent or the original patent.

UNITED STATES PATENTS

| | | | |
|---|---|---|---|
| 3,184,871 | 5/1965 | D'Alessandro | 38—77.8 |
| 3,695,066 | 10/1972 | Doyel | 38—69 |
| 468,554 | 2/1892 | Weller | 38—93 |
| 2,998,924 | 5/1961 | Schaeffer | 68—222 |
| 3,470,719 | 10/1969 | Frank | 38—69 |
| 3,646,317 | 2/1972 | Osrow | 68—222 |

PATRICK D. LAWSON, Primary Examiner

U.S. Cl. X.R.

68—222